United States Patent Office 2,750,998
Patented June 19, 1956

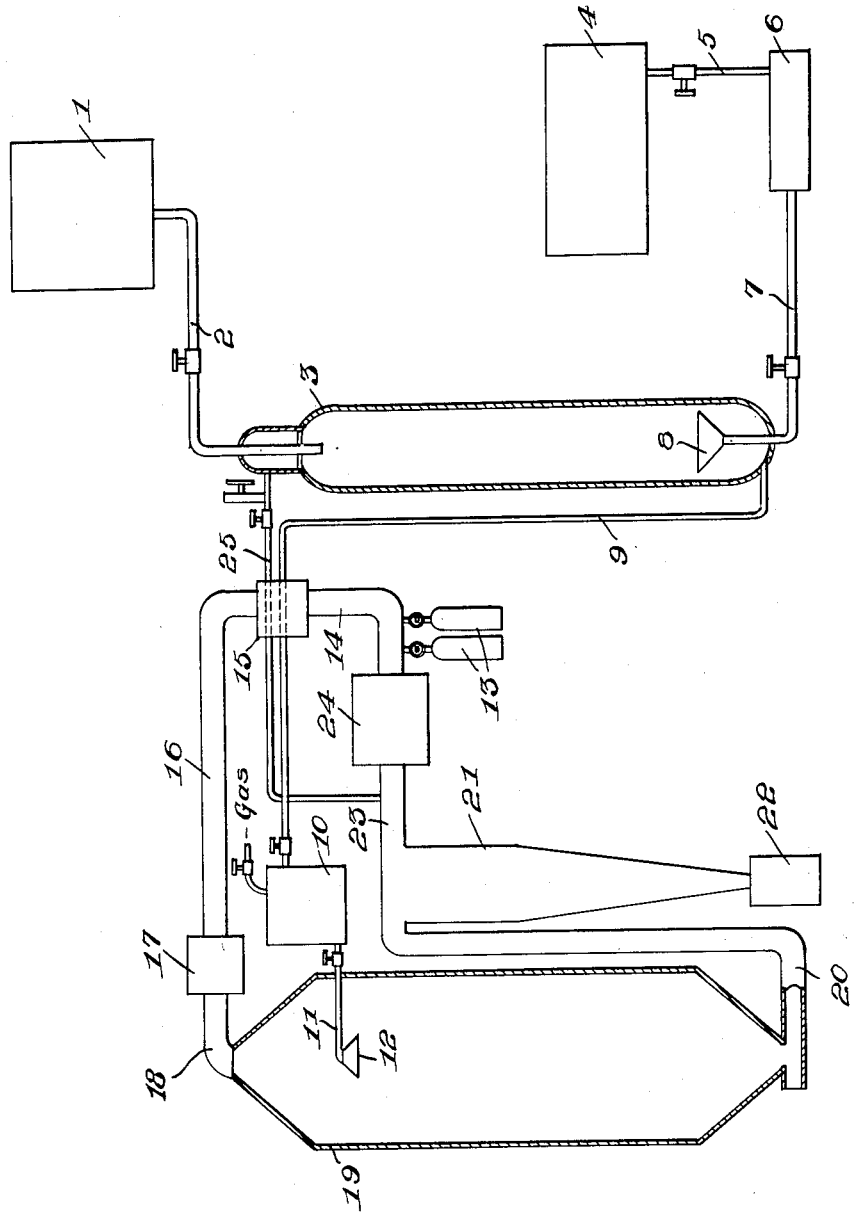

2,750,998

APPARATUS FOR REDUCING FOOD LIQUIDS TO POWDERS

David Pelton Moore, Glen Oaks, N. Y.

Application November 29, 1951, Serial No. 258,873

2 Claims. (Cl. 159—4)

The present invention relates to improvements in apparatus for reducing food liquids to powders, and relates more particularly to an apparatus and a method whereby liquids, and juices or the like that carry a portion that can be rendered into a powder, can be so treated as to produce powders that can be packaged and kept fresh without refrigeration, and which when dissolved in water regain to a great extent, the same qualities that were in the original liquid.

One of the objects of the present invention, particularly when orange juices are to be dehydrated, is to subject the juice before spray drying to a nitrogen action or deoxygenizing, so that the juice will have its particles deoxygenated with the inert gas, and which prevents oxidation of the juice when rendered into a powdered form in a spray dryer using heated air as the dehydrating agent, but which if desired can be dehydrated with an inert gas, in this case nitrogen.

The invention here set forth will be described as relating more particularly to the production of powders from citrus fruits, such as oranges, grapefruit, limes and lemons, or any combinations thereof.

The main feature of this process or method of making desiccated or dehydrated powders from liquid forms, resides in the fact that the particles in the liquids must be prevented from being oxidized, which oxidizing changes materially the flavor and also causes the loss of vitamins, and in this instance it is accomplished by causing a non-oxidizing inert gas to commingle with the liquid to be operated upon and pass through the liquid in an opposite direction to the flow of the liquid, and which is known in common parlance as "stripping."

It has been found that particularly orange juice loses a great amount of its original flavor when made and packaged in the usual way, that is plain juice extraction and canning, and also that the juice concentrate requires refrigeration.

With the present process, the juice is extracted, gas deoxygenated where possible, in the presence of nitrogen gas, and then subjected to a nitrogen gas spray drying, while the extracted juice is atomized under the pressure of such gas, and the resultant powder packaged with nitrogen or inert gas. Thus in this manner, the juice at no time comes in contact with, or contacts the atmosphere that tends to oxidize it.

Also where a plant for the making of a juice concentrate, is in use, the present process starts after the precision juicer has completed its operation, and is substituted for the juice boilers, whereby according to the present invention the juice is concentrated without being cooked, therefore not requiring the freezing of the concentrate, but only the nitrogen packaging of the powder made from the juice produced by the precision juicer.

In order that one plant set-up of the present invention may be understood and its advantages fully appreciated, attention is invited to the drawing, in which is shown partly in section and partly in diagram one type of apparatus, including a precision juicer.

Referring to the drawing, the numeral 1 designates a precision juicer, which is preferably surrounded by a case, not shown, and in which an atmosphere of nitrogen gas is maintained, so that no air contacts this freshly extracted juice, which now flows by gravity, or by nitrogen gas pressure, through a valved conduit or pipe 2, to a nitrogen gas deoxygenator 3.

To furnish the nitrogen gas for acting on the inflowing juice to the upper end of the deoxygenator 3, a nitrogen gas supply tank 4, indicative of any means whereby the pressured gas can be stored, for supply through a valved conduit or pipe 5, to the nitrogen gas supply tank 6. The gas from this tank is then conveyed through a valved pipe 7, to and through the spray head 8, so that very fine streams of the gas under pressure passes upwardly, permeating the down flowing juice within the deoxygenator 3, and where such juice is deoxygenated, which prevents the oxidation of the orange juice in the spray drying of the same with heated air or nitrogen, either of which may be used.

This continuous flow of the juice through the deoxygenator 3, is then conducted therefrom through a valved conduit or pipe 9, into a nitrogen gas filled and supplied spray drier supply tank 10, or several tanks, as may be desired and required. A valved conduit or pipe 11, leads to an atomizer 12, positioned within and adjacent the upper end of a spray drier 19, the details of which will be set forth later on.

To supply the drying gas, in this instance nitrogen gas, to such spray drier, cylinders 13, or other nitrogen gas supplying means, deliver the gas through the valved outlets or outlet thereof directly in to a large pipe 14, which in turn conveys this gas to the rotary blower 15, which then blows the gas through a second conduit 16, to and through an electric heater 17, where the short pipe 18 directs the heated gas to the apex of the spray drier 19.

Thus as the juice is atomized through the head 12 into the down flowing heated gas it is impinged by the heated gas, a powder is the resultant, and this is carried with the gas to the bottom conduit 20, and upwardly, where the powder due to its specific gravity falls in to the vertical elongated mouthed chamber 21, and finally into the packaging member 22, the moving gas free of the powder then passing through the conduit 23, into the moisture remover 24, and thence on around through the conduit 14. By this arrangement, the gas can be used over and over again, while gas controlled meters, situated within the system, and not shown, control the valves upon the cylinders 13, to maintain the precise amount of gas required, and to compensate for any loss due to leakages and the like.

Also another method of gas replenishment that can be used is supplied by the exhaust nitrogen gas from the deoxygenator 3, the gas after acting upon the downwardly flowing juices, is passed out at the dome of the deoxygenator, through a valved conduit or pipe 25, into the conduit 23, where it is conducted to and acted upon by the moisture remover 24, and replenishes the gas within the spray drying apparatus.

Where, however, the deoxygenator is not desired, the juice may be conducted directly from the precision juicer 1 to the tank 10, and also where the precision juicer is not used, the extracted juice, preferably extracted in a nitrogen gas atmosphere is supplied directly under nitrogen gas pressure to the tank or tanks 10, for it must be understood that for a continuous spray drying operation, two or more tanks 10 are to be used, that is while one is being used to deliver the juice to the atomizer 12, the other is being filled.

At the point 22, the powder is packaged in a nitrogen gas atmosphere, and this may take place by packaging in individual vinyl packages, glass jars, and/or cans. It is absolutely essential that no air contact the powders during this complete operation, so that the powder when delivered to the user, and opened, has for its first time been subjected to the air.

From the foregoing, it will be noted that the deoxygenating of the juice can be used with the spray dryer, using either heated air or nitrogen as the dehydrating agent, when orange juice or other delicately flavored liquids are to be dehydrated; and also where desirable the deoxygenator may be dispensed with, but not where delicately flavored liquids, particularly orange, or similar citrus juices are to be rendered into powder. In the latter instance it has been found that orange juice, when put through a nitrogen stripping operation, can be directly spray dried in heated air atmosphere, as the nitrogen gas entirely deoxygenates such treated juice, and thus during the air spray drying thereof prevents oxidation of the orange juice during the air spray drying thereof, after which the powder is immediately removed and placed in a nitrogen gas atmosphere and packaged.

Although great stress is here laid to the dehydrating of orange, and other citrus fruit juices, it is apparent that by the use of the closed non-oxidizing gas dehydrating circuit herein set forth, that such liquids as coffee, milk, eggs, and all fruit and vegetable juices, can be treated, and that such treatment will retain all or most of the original flavor and aroma, as well as the enzymes and vitamins. Also though nitrogen gas is here stressed, with certain fluids other than citrus fruit juices other inert gases, such as carbon dioxide and combinations may be used.

The main idea being to prevent air exposure to the liquid to be treated from the beginning of the present process to the packaging of the product in gas filled, air-tight packages, that do not require refrigeration, but can be kept for an indefinite period of time at normal temperatures without deterioration.

The apparatus and process and methods herein set forth are applicable to produce powders from apples, plums, peaches, apricots, pears, grapes and any other fruits, similarly as it may be applied to citrus fruits, while when tea, milk, coffee, eggs and the like are so treated, the original flavor and aroma are retained, so that when any of these powders are dissolved in water, either flat or carbonated, a naturally flavored and aroma drink results.

It will thus be seen that by forcing the inert gas upwardly through the column 3, while the liquid is forced downwardly from the top and through the column 3, that the gas so commingles with the particles of the liquid, that the thus treated liquid can then be treated with heated air or gas, to produce a desiccated or dehydrated powder that is readily soluble in water, and which due to the fact that the liquid and its particles have been prevented from becoming oxidized, that a regenerated liquid results that has approximately all of the natural constituents of the original liquid.

What is claimed is:

1. An apparatus of the character described, including in combination a dehydratable liquid supply, an inert gas supply, a closed chamber, means leading from the liquid supply to one end of the chamber, means leading from the inert gas supply to the opposite end of said chamber, whereby the gas permeates the moving liquid in said chamber and whereby the gas deoxygenates the liquid, means for leading the deoxygenated liquid from the chamber at a point opposite to the inlet of the liquid to said chamber, a tank connected to said last named means to receive the deoxygenated liquid, means for leading such liquid away from said tank, and a dehydrating apparatus connected to the latter means to dehydrate the deoxygenated liquid led from the tank.

2. An apparatus as claimed in claim 1, wherein means is provided to supply an inert gas to the dehydrating apparatus as a dehydrating vehicle, and means for condensing the moisture in the gas as it leaves the dehydrating apparatus.

References Cited in the file of this patent

UNITED STATES PATENTS

| | | |
|---|---|---|
| 999,972 | Ekenberg | Aug. 8, 1911 |
| 1,484,271 | Murdock | Feb. 19, 1924 |
| 1,782,054 | Uhl | Nov. 18, 1930 |
| 1,829,477 | Douthitt | Oct. 27, 1931 |
| 2,035,619 | Robinson | Mar. 31, 1936 |
| 2,328,892 | Colgate et al. | Sept. 7, 1943 |
| 2,559,989 | Nyrop | July 10, 1951 |
| 2,561,394 | Marshall | July 24, 1951 |
| 2,566,229 | Mackay | Aug. 28, 1951 |
| 2,570,213 | Cross | Oct. 9, 1951 |
| 2,616,838 | Williams | Nov. 4, 1952 |

FOREIGN PATENTS

| | | |
|---|---|---|
| 15,231/28 | Australia | Aug. 22, 1928 |

OTHER REFERENCES

Article by Burton, L. V., "High Vacuum Technics Utilized for Drying Orange Juice"; Food Industries (magazine); May 1947; pages 107–112 and 228. (Copy in Division 19, 159–48.)